US011064094B2

(12) United States Patent  
Sevilla

(10) Patent No.: US 11,064,094 B2  
(45) Date of Patent: Jul. 13, 2021

(54) IMAGE FORMING APPARATUS FOR FORMING IMAGE REPRESENTED BY IMAGE DATA ON RECORDING PAPER SHEET

(71) Applicant: KYOCERA Document Solutions Inc., Osaka (JP)

(72) Inventor: Anthony Sevilla, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/801,951

(22) Filed: Feb. 26, 2020

(65) Prior Publication Data

US 2020/0296258 A1 Sep. 17, 2020

(30) Foreign Application Priority Data

Mar. 11, 2019 (JP) .............................. JP2019-044008

(51) Int. Cl.
*H04N 1/387* (2006.01)
*G06K 9/20* (2006.01)
(Continued)

(52) U.S. Cl.
CPC ......... *H04N 1/6094* (2013.01); *G06K 9/2063* (2013.01); *H04N 1/00824* (2013.01);
(Continued)

(58) Field of Classification Search
CPC . G06F 3/1204; G06F 3/1257; G06K 2209/01; G06K 9/2063; G06K 9/00496;
(Continued)

(56) References Cited

U.S. PATENT DOCUMENTS

2004/0080532 A1* 4/2004 Cragun .................. G06F 16/34  
                                                                 715/745  
2008/0108029 A1* 5/2008 Luke ...................... G09B 5/00  
                                                                 434/178

(Continued)

FOREIGN PATENT DOCUMENTS

JP      2008-107462 A     5/2008  
JP      2008107462 A  *  5/2008

*Primary Examiner* — Chad Dickerson  
(74) *Attorney, Agent, or Firm* — IP Business Solutions, LLC

(57) ABSTRACT

An image forming apparatus includes: a text extractor that analyses an image of an original document read by an image reading device and extracts a text in the original document and location information on the text in association with each other; an acquirer that acquires correspondence information in which a keyword and specification information are associated with each other; a searcher that searches the text in the original document for a target term matching the keyword; an identifier that identifies a location of the target term within the image of the original document from the location information on the text extracted by the text extractor; and an image data generator that generates image data in which an image in a mode of presentation specified by the specification information in the correspondence information acquired by the acquirer is synthesized on the location of the target term identified by the identifier.

5 Claims, 15 Drawing Sheets

(51) Int. Cl.
*H04N 1/00* (2006.01)
*H04N 1/60* (2006.01)
*H04N 1/32* (2006.01)

(52) U.S. Cl.
CPC ..... *H04N 1/32112* (2013.01); *H04N 1/32128* (2013.01); *G06K 2209/01* (2013.01)

(58) Field of Classification Search
CPC ............ H04N 1/00824; H04N 1/3871; H04N 1/6094; H04N 1/32042; H04N 1/00355; H04N 1/00358; H04N 1/00371
USPC ........................................ 358/1.11–1.18, 1.6
See application file for complete search history.

(56) References Cited

U.S. PATENT DOCUMENTS

2011/0276541 A1* 11/2011 Ono .................... G06F 11/3476
    707/687
2014/0184607 A1* 7/2014 Toyoshima ........... G06T 11/206
    345/440

\* cited by examiner

Fig.4A
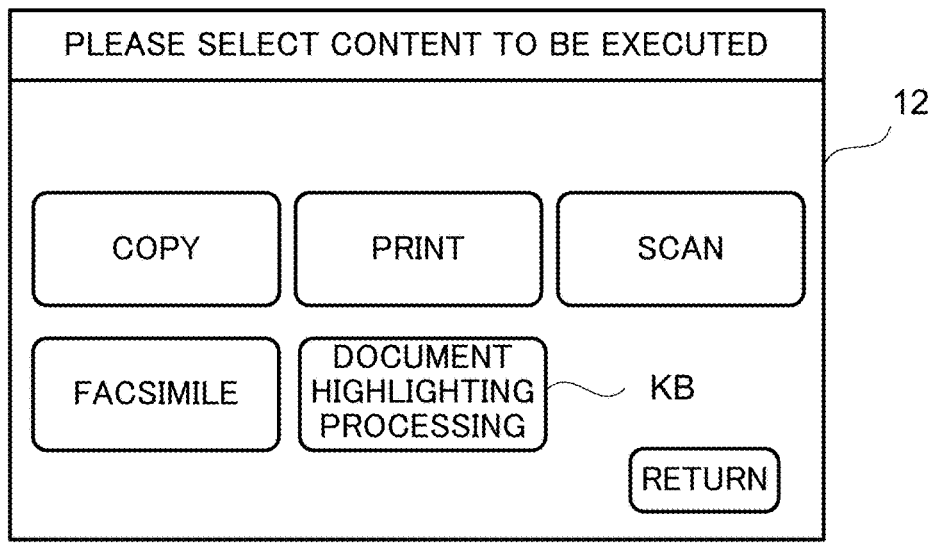
Fig.4B
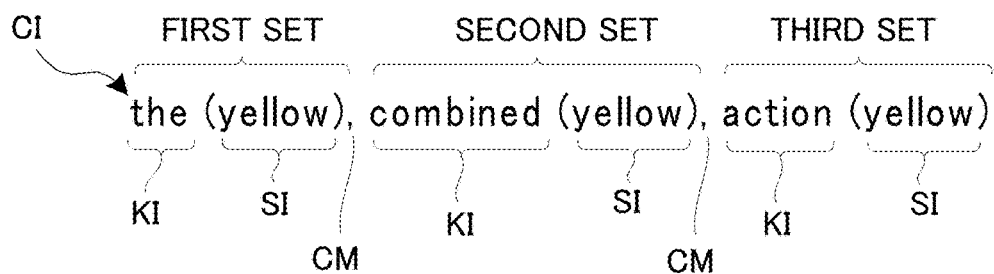
Fig.4C
| SPECIFICATION INFORMATION SI | MODE OF PRESENTATION |
|---|---|
| yellow | YELLOW MARKER |
| black | BLACK MARKER |
| ⋮ | ⋮ |
| mesh | SHADING |
| underline | UNDERLINING |
| strikethrough | ADDITION OF A STRIKE-THROUGH LINE |
| ⋮ | ⋮ |

| SPECIFICATION INFORMATION | MODE OF PRESENTATION |
|---|---|
| yellow | YELLOW MARKER |
| black | BLACK MARKER |
| ⋮ | ⋮ |
| mesh | SHADING |
| underline | UNDERLINING |
| strikethrough | ADDITION OF A STRIKE-THROUGH LINE |
| ⋮ | ⋮ |
| bold | BOLD FONT |
| italic | ITALIC FONT |
| ⋮ | ⋮ |

TB2

IMAGE FORMING APPARATUS FOR FORMING IMAGE REPRESENTED BY IMAGE DATA ON RECORDING PAPER SHEET

INCORPORATION BY REFERENCE

This application claims priority to Japanese Patent Application No. 2019-044008 filed on Mar. 11, 2019, the entire contents of which are incorporated by reference herein.

BACKGROUND

The present disclosure relates to a technique for processing an image of an original document, without making any change to the original document itself, to create a new document image.

In the presence of a printed paper document formed of a plurality of pages, a user may want to know where in the document a keyword is described. For example, there is an image forming apparatus that acquires a result of recognition of characters from an image of an original document and the locations of the characters within the original document, searches the character recognition result for a character string hit by an input search word, and makes, on the original document, overwrite printing for coloring the location of the character string hit by the search within the original document.

SUMMARY

A technique improved over the aforementioned technique is proposed as one aspect of the present disclosure.

An image forming apparatus according to an aspect of the present disclosure includes an image reading device, an original document image storage device, and a control device. The image reading device reads an image of an original document. The original document image storage device stores the image of the original document read by the image reading device. The control device includes a processor and functions, through the processor executing a control program, as a text extractor, an acquirer, a searcher, an identifier, and an image data generator. The text extractor analyses the image of the original document stored in the original document image storage device and extracts a text in the original document and location information on the text in association with each other. The acquirer acquires correspondence information in which a predetermined keyword and a predetermined piece of specification information specifying a mode of presentation in a location of the keyword are associated with each other. The searcher searches the text in the original document extracted by the text extractor for a target term matching the keyword of the correspondence information acquired by the acquirer. The identifier identifies the target term for which the searcher has searched, and also identifies a location of the target term within the image of the original document from the location information on the text extracted by the text extractor. The image data generator generates image data in which an image presented in the mode of presentation specified by the piece of specification information in the correspondence information acquired by the acquirer is synthesized on the location of the target term identified by the identifier and being within the image of the original document stored in the original document image storage device.

BRIEF DESCRIPTION OF THE DRAWINGS

FIG. 4A is a view showing an example of a display screen on a display device of the image forming apparatus.

FIG. 4B shows an example of correspondence information printed on a CSV document.

FIG. 4C shows an example of a correspondence information storage table.

DETAILED DESCRIPTION

Figure 1:
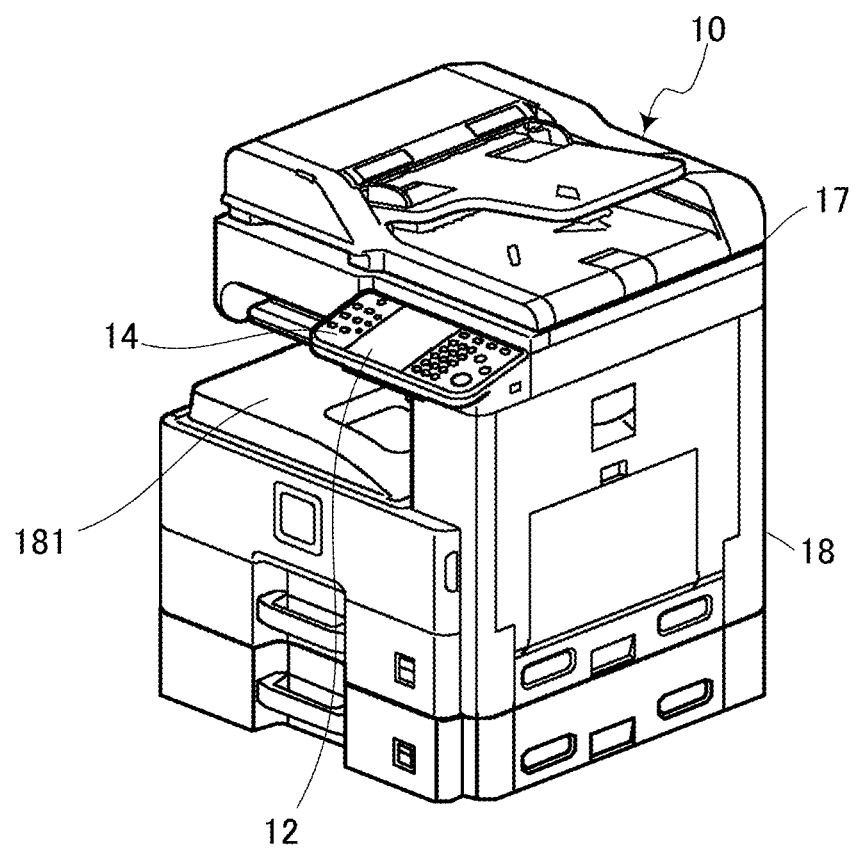
FIG. 1 is a perspective view showing an image forming apparatus according to a first embodiment of the present disclosure.
Figure 2:
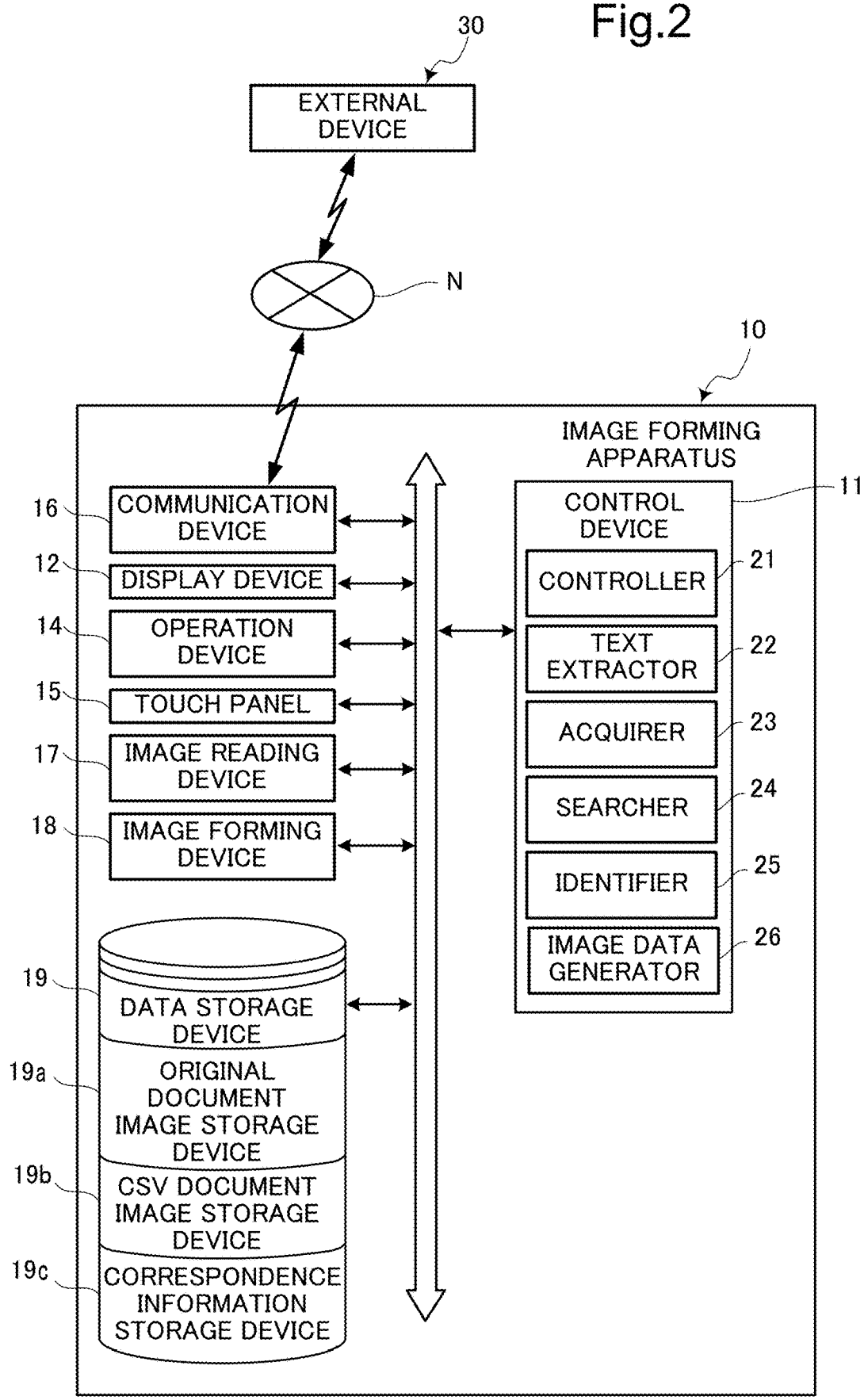
FIG. 2 is a block diagram showing the configuration of the image forming apparatus according to the first embodiment.

Hereinafter, a description will be given of image forming apparatuses according to embodiments of the present disclosure with reference to the drawings. FIG. 1 is a perspective view showing an image forming apparatus according to a first embodiment of the present disclosure. FIG. 2 is a block diagram showing the configuration of the image forming apparatus according to the first embodiment.

The image forming apparatus 10 according to the first embodiment includes a control device 11, a display device 12, an operation device 14, a touch panel 15, a communication device 16, an image reading device 17, an image forming device 18, and a data storage device 19. These components are capable of data or signal transfer via a bus among them.

The image reading device 17 is, for example, a CCD (charge coupled device) serving as a scanner for optically reading an original document G1 and has the function of generating image data representing an image of the original document G1. The image reading device 17 is a general reader for reading an original document G1 being conveyed by an auto document feeder or an original document G1 placed on a flatbed.

The image forming device 18 uniformly charges the surface of each photosensitive drum, exposes the surface of the photosensitive drum to form an electrostatic latent image on the surface of the photosensitive drum, develops the electrostatic latent image into a toner image, transfers the toner image (the image) on the surface of the photosensitive drum to a recording paper sheet, and fixes the toner image on the recording paper sheet. For example, the image forming device 18 prints on the recording paper sheet a document image obtained by reading of the original document G1 by the image reading device 17.

The display device 12 is a display device, for example, such as a liquid crystal display (LCD) or an organic EL (organic light-emitting diode (OLED)) display.

The touch panel 15 is disposed on the front of the screen of the display device 12. The touch panel 15 is a touch panel of, for example, a so-called resistive film system or a capacitance system and is capable of detecting a touch of the touch panel 15 with a user's finger or the like, together with the point of touch, and outputting a detection signal indicating the coordinate of the point of touch to a below-described controller 21 of the control device 11 and so on. Therefore, the touch panel 15 serves as an operation device through which a user's operation made on the screen of the display device 12 is input.

The operation device 14 is designed to accept entry of instructions on various operations from a user and includes various keys, such as a menu key for calling up a menu, arrow keys for moving the focus of a GUI (graphical user interface) forming the menu, an accept key for performing a determination operation for the GUI forming the menu, and a start key.

The communication device 16 is a communication interface including a communication module and has the function of sending and receiving data to and from an external device 30 (for example, a personal computer, a server or a mobile information terminal) via a network N formed of a LAN (local area network), a public line or the like.

The data storage device 19 is a large storage device, such as an HDD (hard disk drive). The data storage device 19 includes an original document image storage device 19a that stores image data representing the image of the original document G1 obtained by reading of the original document G1 by the image reading device 17.

Figure 3:
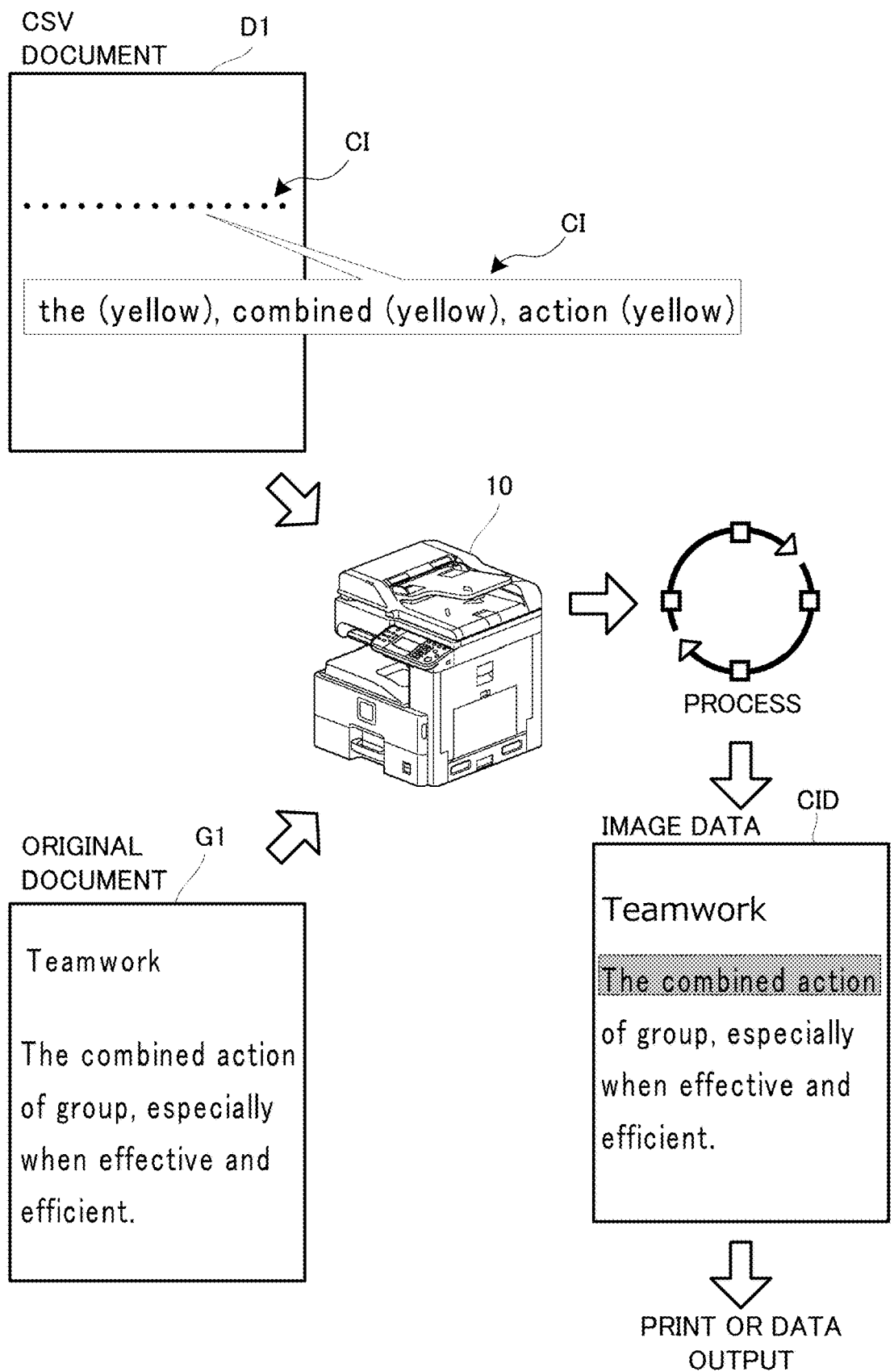
FIG. 3 is a diagram conceptually showing processing for generating image data executed on the image forming apparatus according to the first embodiment, wherein in the image data the location of a target term within image data of an original document is highlighted.

FIG. 3 is a diagram conceptually showing processing for generating image data executed on the image forming apparatus according to the first embodiment, wherein in the image data the location of a target term within image data of an original document is highlighted. The image forming apparatus 10 according to the first embodiment has, as shown in FIG. 3, a configuration for executing processing for reading an original document G1 and a CSV document D1 and generating image data in which, in relation to respective target terms matching keywords KI specified by the CSV document D1, the locations of the target terms within image data of the original document G1 are highlighted.

The data storage device 19 further includes a CSV document image storage device 19b that stores CSV document image data representing an image of the CSV document D1 obtained by reading of the CSV document D1 shown in FIG. 3 by the image reading device 17. As shown in FIG. 3, correspondence information CI described as "the (yellow), combined (yellow), action (yellow)" is printed on the CSV document D1 in the first embodiment. The CSV document D1 is an example of a print defined in What is claimed is.

A description will be given below of the correspondence information CI with reference to FIG. 4B. FIG. 4B shows an example of correspondence information printed on a CSV document.

As shown in FIG. 4B, the correspondence information CI is data in a CSV (comma separated value) format which includes at least one unit of information consisting of a set containing a predetermined keyword KI ("the", "combined", and "action"), a pair of parentheses placed just after (for example, immediately to the right of) the keyword KI, and a piece of specification information SI placed in the pair of parentheses and in which when including a plurality of units of information, a comma CM is placed between each adjacent pair of the plurality of units of information to separate each unit of information with the comma CM. Specifically, the correspondence information CI includes a unit of information consisting of a set (first set) containing "the" as a predetermined keyword KI and "yellow" as a piece of specification information SI, a unit of information consisting of a set (second set) containing "combined" as a predetermined keyword KI and "yellow" as a piece of specification information SI, and a unit of information consisting of a set (third set) containing "action" as a predetermined keyword KI and "yellow" as a piece of specification information SI.

Furthermore, the data storage device 19 also includes a correspondence information storage device 19c that stores correspondence information CI extracted from the stored CSV document image data by a below-described acquirer 23. The correspondence information storage device 19c contains a storage table (correspondence information storage table) TB1 shown in FIG. 4C. FIG. 4C shows an example of a correspondence information storage table. As shown in FIG. 4C, the storage table TB1 previously stores each piece of specification information SI and its mode of presentation in association with each other. When a piece of specification information SI in the storage table TB1 shown in FIG. 4C is color data indicating a color, for example, "yellow", this shows that its mode of presentation is a "yellow marker". When a piece of specification information SI is "black", this shows that its mode of presentation is a "black marker". When a piece of specification information SI is pattern data indicating a pattern, for example, "mesh", this shows that its mode of presentation is "shading". When a piece of specification information SI is line data indicating a line, for example, "underline", this shows that its mode of presentation is "underlining". When a piece of specification information SI is, for example, "strikethrough", this shows that its mode of presentation is "addition of a strike-through line".

The control device 11 is formed of a processor, a RAM (random access memory), a ROM (read only memory), and so on. The processor is, for example, a CPU (central processing unit), an MPU or an ASIC. When a control program stored in the data storage device 19 is executed by the above processor, the control device 11 functions as a controller 21, a text extractor 22, an acquirer 23, a searcher 24, an identifier 25, and an image data generator 26. Alternatively, each of the controller 21, the text extractor 22, the acquirer 23, the searcher 24, the identifier 25, and the image data generator 26 of the control device 11 may not be implemented by the operation of the control device 11 in accordance with the above control program but may be constituted by a hardware circuit.

The controller 21 governs the overall operation control of the image forming apparatus 10.

The text extractor 22 analyses the image of the original document G1 stored in the original document image storage device 19a and extracts a text in the original document G1 and location information on the text in association with each other. For example, the text extractor 22 does OCR (optical character recognition) processing on the image of the original document G1 stored in the original document image storage device 19a to extract an text in the original document G1 and also extract location information on the text in conjunction with the text. The location information on the text extracted by the text extractor 22 is information indicating the location of the text within the original document G1, i.e., location information within the original document G1. The location information within the original document G1 contains various kinds of information including: what number sheet of the original document G1 the text is located on; which side of the sheet the text is located on; and coordinates of the text in the page. The text extractor 22 allows the original document image storage device 19a to store the text in the original document G1 and its location information in conjunction with each other.

The acquirer 23 acquires correspondence information CI in which a predetermined keyword KI is associated with a predetermined piece of specification information SI specifying a mode of presentation in the location of the keyword KI. Specifically, the image reading device 17 reads an image of a CSV document D1 (print) on which correspondence information CI is printed. The CSV document image storage device 19b stores, under the control of the controller 21, CSV document image data representing the image of the CSV document D1 read by the image reading device 17. The CSV document image storage device 19b is an example of a print image storage device defined in What is claimed is. The acquirer 23 analyses the image (i.e., CSV document image data) of the CSV document D1 stored in the CSV document image storage device 19b and extracts correspondence information CI in the CSV document D1 to acquire the correspondence information CI. For example, the acquirer 23 does OCR processing on the image of the CSV document D1 stored in the CSV document image storage device 19b to extract correspondence information CI in the CSV document D1 (specifically, text data indicating the correspondence information CI) as shown in FIG. 4B. In the first embodiment, the acquirer 23 acquires a plurality of (three) units of information constituting the correspondence information CI. Then, the correspondence information storage device 19c stores, under the control of the controller 21, the correspondence information CI composed of three units of information extracted by the acquirer 23 and shown in FIG. 4B. Thus, the correspondence information CI can be acquired from the CSV document D1 on which the correspondence information CI is printed.

The searcher 24 searches the text in the original document G1 extracted by the text extractor 22 for a target term matching each keyword KI of the correspondence information CI acquired by the acquirer 23. For example, the original document G1 shown in FIG. 3 has a description of "The combined action of group, especially when effective and efficient." written in black letters and the description contains keywords KI ("the", "combined", and "action") of the correspondence information CI acquired by the acquirer 23. Accordingly, the searcher 24 searches the text in the original document G1 extracted by the text extractor 22 for a target term matching each of the keywords KI ("the", "combined", and "action") of the correspondence information CI acquired by the acquirer 23 (specifically, in FIG. 3, searches for "the", "combined", and "action" in the text of the original document G1).

Figure 7:
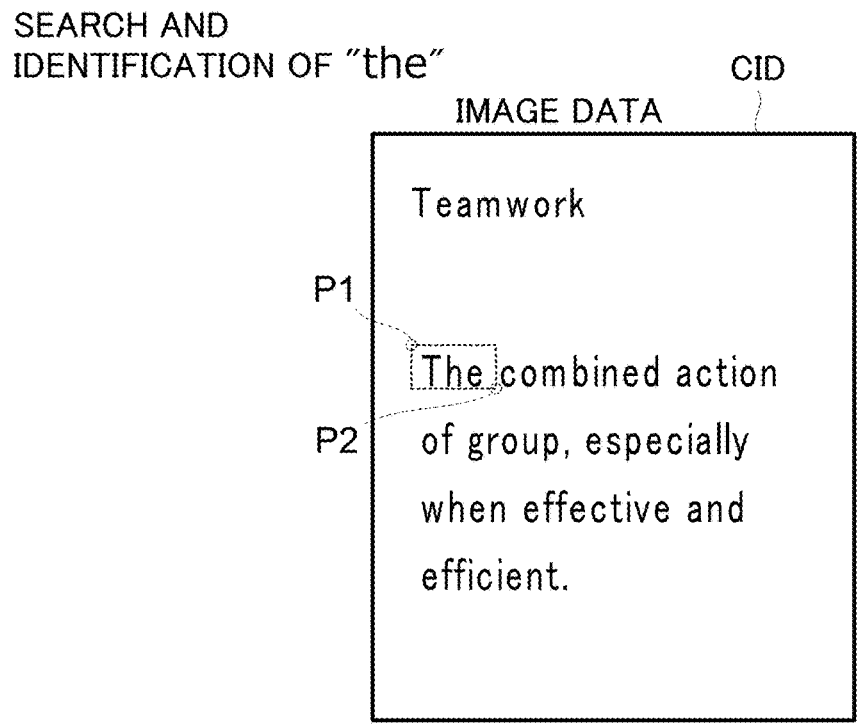
FIG. 7 is a diagram showing an exemplary case where the location of a target term within the image data of the original document is identified and the location is then highlighted in a mode of presentation specified by the CSV document.

The identifier 25 identifies the target term for which the searcher 24 has searched, and also identifies the location of the target term within the image of the original document G1 from the location information on the text extracted by the text extractor 22. For example, since the correspondence information CI in the CSV document D1 shown in FIG. 3 contains three keywords KI ("the", "combined", and "action"), the identifier 25 identifies the three target terms for which the searcher 24 has searched, and also identifies respective locations of the three target terms within the image of the original document G1 from the location information on the text extracted by the text extractor 22. Specifically, in the case where the target term is "the" as shown in FIG. 7 to be described hereinafter, the identifier 25 identifies the target term "the" for which the searcher 24 has searched, and also identifies the location of the target term "the" within the image of the original document G1 (more specifically, two coordinates P1 and P2 of the upper left and lower right corners in the location of "the") from the location information on the text extracted by the text extractor 22. Furthermore, also for the remaining target terms, "combined" and "action", the identifier 25 makes identification in the same manner as described above.

The image data generator 26 generates image data in which an image presented in a mode of presentation specified by the piece of specification information SI in the correspondence information CI acquired by the acquirer 23 is synthesized on the location of the target term identified by the identifier 25 and being within the image of the original document G1 stored in the original document image storage device 19a. Specifically, in the case where the target term is "the" as shown in FIG. 7 to be described hereinafter, the image data generator 26 generates image data in which an image (a yellow marker formed of a portion enclosed by the broken-line box shown in FIG. 7 and filled in with yellow) presented in a mode of presentation ("yellow marker" shown in FIG. 4C) specified by the piece of specification information SI ("yellow" shown in FIG. 4B) in the correspondence information CI acquired by the acquirer 23 is synthesized on the location of the target term "the" identified by the identifier 25 and being within the image (image data) of the original document G1.

More specifically, in the case where the target term is "the", the image data generator 26 sets a rectangular region having as corners two coordinates P1 and P2 (the coordinates of the upper left and lower right corners in the location of "the" within the image of the original document G1) identified by the identifier 25 and fills the rectangular region with yellow to generate an image of a yellow marker. Then, the image data generator 26 generates image data in which the image of the yellow marker is synthesized on the image of the original document G1 to align the upper left and lower right corners of the image of the yellow marker with the two coordinates P1 and P2 within the image of the original document G1. Furthermore, the image data generator 26 generates, as for the remaining target terms, "combined" and "action", images of yellow markers in the same manner as described above and sequentially synthesizes the images of yellow markers on the corresponding locations, thus generating image data in which the images of yellow markers are synthesized on the locations of "the combined action" as shown in FIG. 3.

Note that in the first embodiment the images of yellow markers are images having transparency. Therefore, the visibility of "the combined action" formed of black letters as shown in FIG. 3 is secured. For example, if images of black markers are synthesized on the above locations, the visibility of "the combined action" formed of black letters as shown in FIG. 3 is lost, so that only the black markers are recognized. For another example, if the images of yellow markers are images having opacity (a transparency of 0%), the visibility of "the combined action" is lost, so that only the yellow markers are recognized.

In the first embodiment, when the correspondence information CI is composed of a plurality of (three) units of information as shown in FIG. 4B, image data is generated by associating and synthesizing images presented in a mode of presentation ("yellow marker" shown in FIG. 4C) specified by the pieces of specification information SI ("yellow" shown in FIG. 4B) in the plurality of units of information acquired by the acquirer 23 with the respective locations of three target terms ("the", "combined", and "action") identified by the identifier 25 and being within the image of the original document G1 stored in the original document image storage device 19*a*. However, image data to be generated is not limited to the above case. For example, when the correspondence information CI is composed of a single unit of information, the image data generator 26 generates image data in which an image presented in a mode of presentation specified by a piece of specification information SI in the single unit of information acquired by the acquirer 23 is synthesized on the location of a single target term identified by the identifier 25 and being within the image of the original document G1 stored in the original document image storage device 19*a*.

When a user's operation for printing instruction is made on the operation device 14, the controller 21 allows the image forming device 18 to form on a recording paper sheet an image represented by the image data generated by the image data generator 26. Alternatively, when a user's operation for data output instruction is made on the operation device 14, the controller 21 allows the communication device 16 to transmit (output) the image data generated by the image data generator 26 to the external device 30.

Figure 5:
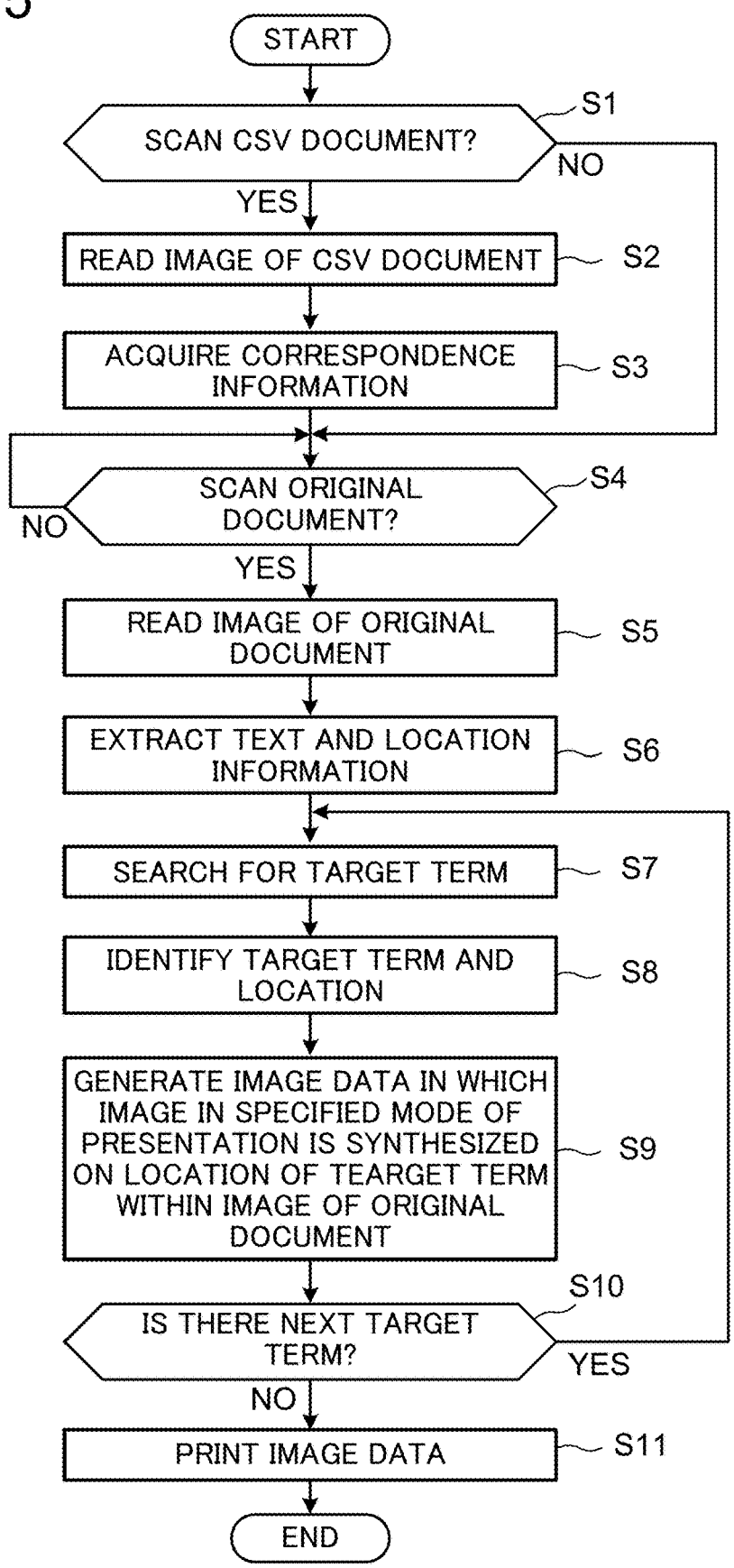
FIG. 5 is a flowchart showing an example of document highlighting processing according to the first embodiment.
Figure 6:
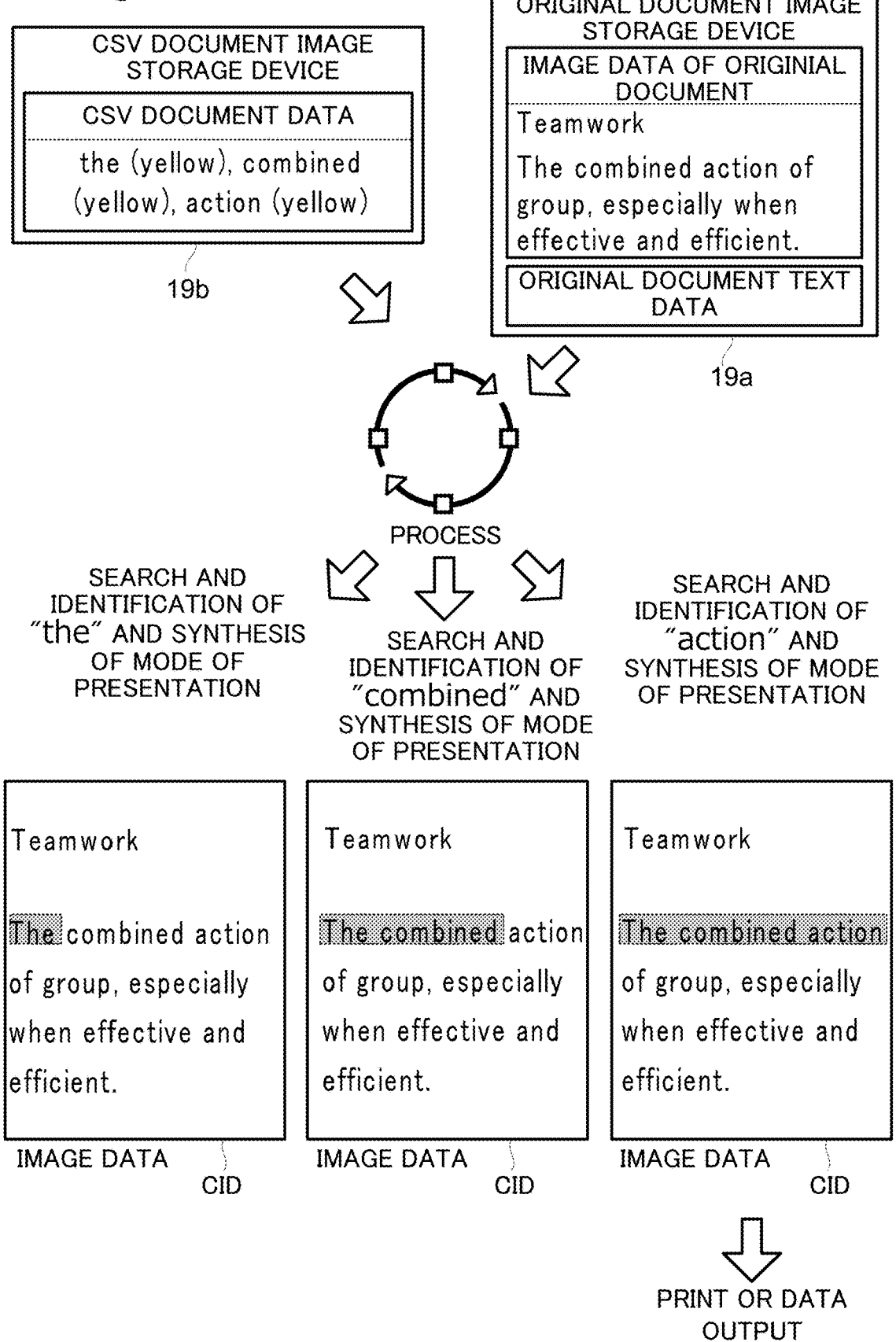
FIG. 6 is a diagram conceptually showing processing for searching original document text data, identifying target terms matching keywords specified by CSV document data, and highlighting the locations of the target terms within the image data of the original document in a mode of presentation specified by the CSV document.

Next, a description will be given of document highlighting processing to be executed by the image forming apparatus 10. FIG. 4A is a view showing an example of a display screen on the display device of the image forming apparatus. FIG. 5 is a flowchart showing an example of document highlighting processing according to the first embodiment. FIG. 6 is a diagram conceptually showing processing for searching original document text data, identifying target terms matching keywords specified by CSV document data, and highlighting the locations of the target terms within the image data of the original document in a mode of presentation specified by the CSV document.

When a display screen shown in FIG. 4A is displayed on the display device 12 and, in this state, the user presses a key KB indicating DOCUMENT HIGHLIGHTING PROCESSING, the controller 21 starts document highlighting processing shown in FIG. 5. Specifically, when the user presses the key KB, the touch panel 15 accepts the press of the key KB and outputs a start signal for the document highlighting processing to the controller 21. Based on the start signal for the document highlighting processing from the touch panel 15, the controller 21 starts the document highlighting processing.

When the user places a CSV document D1 in the image reading device 17 and, in this state, a key indicating "Scan CSV Document" displayed on the display device 12 is pressed (YES in S1), the controller 21 allows the image reading device 17 to read the CSV document D1 (S2). The controller 21 allows the CSV document image storage device 19*b* to store CSV document image data representing an image of the CSV document D1 read by the image reading device 17 as shown in FIG. 6.

The acquirer 23 analyses the image (CSV document image data) of the CSV document D1 stored in the CSV document image storage device 19*b* and extracts correspondence information CI in the CSV document D1 to acquire the correspondence information CI (S3). Specifically, the acquirer 23 does OCR processing on the image of the CSV document D1, thus extracting "the (yellow), combined (yellow), action (yellow)" which is the correspondence information CI in the CSV document D1 shown in FIG. 4B. Then, the controller 21 allows the correspondence information storage device 19*c* to store the correspondence information CI extracted by the acquirer 23 and shown in FIG. 4B.

In the case where the correspondence information CI shown in FIG. 4B has already been stored in the correspondence information storage device 19*c* and is reused, the user may press a key "Next" displayed on the display device 12. When the user presses the key "Next" displayed on the display device 12 (NO in S1), the controller 21 allows the processing to proceed to S4.

When the user places an original document G1 in the image reading device 17 and, in this state, a key indicating "Scan Original Document" displayed on the display device 12 is pressed (YES in S4), the controller 21 allows the image reading device 17 to read the original document G1 (S5). The controller 21 allows the original document image storage device 19*a* to store original document image data representing an image of the original document G1 read by the image reading device 17. When the key indicating "Scan Original Document" displayed on the display device 12 has not been pressed within a predetermined period of time (NO in S4), the controller 21 allows the processing to return to S4 and waits for the key indicating "Scan Original Document" to be pressed.

The text extractor 22 does OCR (optical character recognition) processing on the image of the original document G1 stored in the original document image storage device 19*a* to extract an text in the original document G1 and also extract location information on the text in conjunction with the text (S6). The text extractor 22 allows the original document image storage device 19*a* to store the text (original document text data shown in FIG. 6) in the original document G1 and its location information in conjunction with each other.

Since the correspondence information CI in the CSV document D1 shown in FIG. 6 contains three keywords KI ("the", "combined", and "action"), the searcher 24 first searches the text in the original document G1 extracted by the text extractor 22 for a target term matching "the", which is the first of the keywords KI ("the", "combined", and "action") of the correspondence information CI acquired by the acquirer 23 (specifically, in FIG. 6, searches for "the" in the text of the original document G1) (S7).

The identifier 25 identifies the target term "the" for which the searcher 24 has searched, and also identifies the location of the target term "the" within the image of the original document G1 from the location information on the text extracted by the text extractor 22 (S8).

A description will be given below of the identification of the location of "the" made by the identifier 25, with reference to FIG. 7. FIG. 7 is a view showing an exemplary case where the location of a target term within image data of an original document is identified and the location is then highlighted in a mode of presentation specified by a CSV document. As shown in FIG. 7, the identifier 25 identifies the location of the target term "the" for which the searcher 24 has searched (more specifically, two coordinates P1 and P2 of the upper left and lower right corners in the locations of "the"), from the location information on the text extracted by the text extractor 22.

The image data generator 26 generates image data CID in which an image (a yellow marker formed of a portion enclosed by the broken-line box shown in FIG. 7 and filled in with yellow) presented in a mode of presentation ("yellow marker" shown in FIG. 4C) specified by the piece of specification information SI ("yellow" shown in FIG. 4B) in the correspondence information CI acquired by the acquirer 23 is synthesized on the location of the target term "the" identified by the identifier 25 and being within the image of the original document G1 stored in the original document image storage device 19a (S9). Specifically, the image data generator 26 sets a rectangular region having as corners two coordinates P1 and P2 (the coordinates of the upper left and lower right corners in the location of "the" within the image of the original document G1) identified by the identifier 25 and fills the rectangular region with yellow to generate an image of a yellow marker. Then, the image data generator 26 generates image data CID in which the image of the yellow marker is synthesized on the image of the original document G1 to align the upper left and lower right corners of the image of the yellow marker with the two coordinates P1 and P2 within the image of the original document G1.

When there is a next target term (YES in S10), the controller 21 allows the processing to proceed to S7. In this embodiment, since there are "combined" and "action" as the remaining target terms, the controller 21 allows the processing to proceed to S7. Also for the remaining target terms, "combined" and "action", search by the searcher 24 (S7), identification by the identifier 25 (S8), and generation of image data by the image data generator 26 (S9) are executed.

The image data generator 26 generates, as for the remaining target terms, "combined" and "action", images of yellow markers in the same manner as described above and sequentially synthesizes the images of yellow markers on the corresponding locations, thus generating image data CID in which the images of yellow markers are synthesized on the locations of "the combined action" as shown in FIG. 6.

When there is no further target term (NO in S10) and a user's operation for printing instruction is made on the operation device 14, the controller 21 allows the image forming device 18 to form on a recording paper sheet an image represented by the image data CID generated by the image data generator 26 (S11) and ends the processing. Alternatively, when in S11 a user's operation for data output instruction is made on the operation device 14, the controller 21 may allow the communication device 16 to transmit (output) the image data CID generated by the image data generator 26 to the external device 30 and end the processing.

As thus far described, in the first embodiment, the image reading device 17 reads an image of an original document G1. The original document image storage device 19a stores the image of the original document G1 read by the image reading device 17. The text extractor 22 analyses the image of the original document G1 stored in the original document image storage device 19a and extracts a text in the original document G1 and location information on the text in association with each other. The acquirer 23 acquires correspondence information CI in which a predetermined keyword KI is associated with a predetermined piece of specification information SI specifying a mode of presentation in the location of the keyword KI. The searcher 24 searches the text in the original document G1 extracted by the text extractor 22 for a target term matching the keyword KI of the correspondence information CI acquired by the acquirer 23. The identifier 25 identifies the target term for which the searcher 24 has searched, and also identifies the location of the target term within the image of the original document G1 from the location information on the text extracted by the text extractor 22. The image data generator 26 generates image data in which an image presented in a mode of presentation specified by the piece of specification information SI in the correspondence information CI acquired by the acquirer 23 is synthesized on the location of the target term identified by the identifier 25 and being within the image of the original document G1 stored in the original document image storage device 19a. Thus, image data can be generated in which the mode of presentation in the location of the target term within the image of the original document G1 has been changed. Furthermore, the original document G1 itself has only been read by the image reading device 17 and has not undergone any change. Therefore, the image forming apparatus according to this embodiment can provide, without making any change to the original document G1 itself, image data of an altered document a portion of which corresponding to the location of the target term within the original document G is different in mode of presentation.

In the known image forming apparatus described in the above-mentioned BACKGROUND, color printing is done on the location of a character string hit by search within an original document, so that the resultant document is the original document changed by coloring. In other words, the known image forming apparatus cannot keep the original document unchanged.

Unlike the above, the image forming apparatus according to this embodiment can provide, without making any change to an original document itself, image data of an altered document a portion of which corresponding to the location of the target term within the original document is different in mode of presentation.

Furthermore, the controller 21 allows the image forming device 18 to form on a recording paper sheet an image represented by the image data generated by the image data generator 26. Thus, the image forming apparatus according to this embodiment can provide, without making any change to an original document G1 itself, a recording paper sheet with an image represented by image data of an altered document a portion of which corresponding to the location of the target term within the original document G1 is different in mode of presentation.

Moreover, since the correspondence information CI is data in CSV format in which a comma CM is placed between each adjacent pair of a plurality of units of information, the plurality of units of information can be embedded into the correspondence information CI to separate each unit of information with a comma CM. When the correspondence information CI is composed of a plurality of units of information, the acquirer 23 acquires the plurality of units of information constituting the correspondence information CI. The searcher 24 searches the text in the original document G1 extracted by the text extractor 22 for a plurality of target terms matching the respective keywords KI of the plurality of units of information acquired by the acquirer 23. The identifier 25 identifies the plurality of target terms for which the searcher 24 has searched, and identifies respective locations of the plurality of target terms within the image of the original document G1 from the location information on the text extracted by the text extractor 22. The image data generator 26 generates image data in which respective images presented in respective modes of presentation specified by the pieces of specification information SI in the plurality of units of information acquired by the acquirer 23 are associated and synthesized with the respective locations of the plurality of target terms identified by the identifier 25 and being within the image of the original document G1 stored in the original document image storage device 19a. Thus, the image forming apparatus according to this embodiment can provide image data of an altered document respective portions of which corresponding to the locations of the plurality of target terms within the original document G1 are changed into the associated modes of presentation.

Furthermore, the acquirer 23 acquires, as the predetermined piece of specification information SI, a piece of information specifying the color, shading, underlining or addition of a strike-through line in the location of the keyword KI as shown in FIG. 4C. Thus, image data CID can be generated in which the color in the location of the target term within the image of the original document G1 has been changed (see FIG. 6) or a shade, an underline or a strike-through line is added to the location (see FIG. 13 to be described hereinafter).

Figure 8:
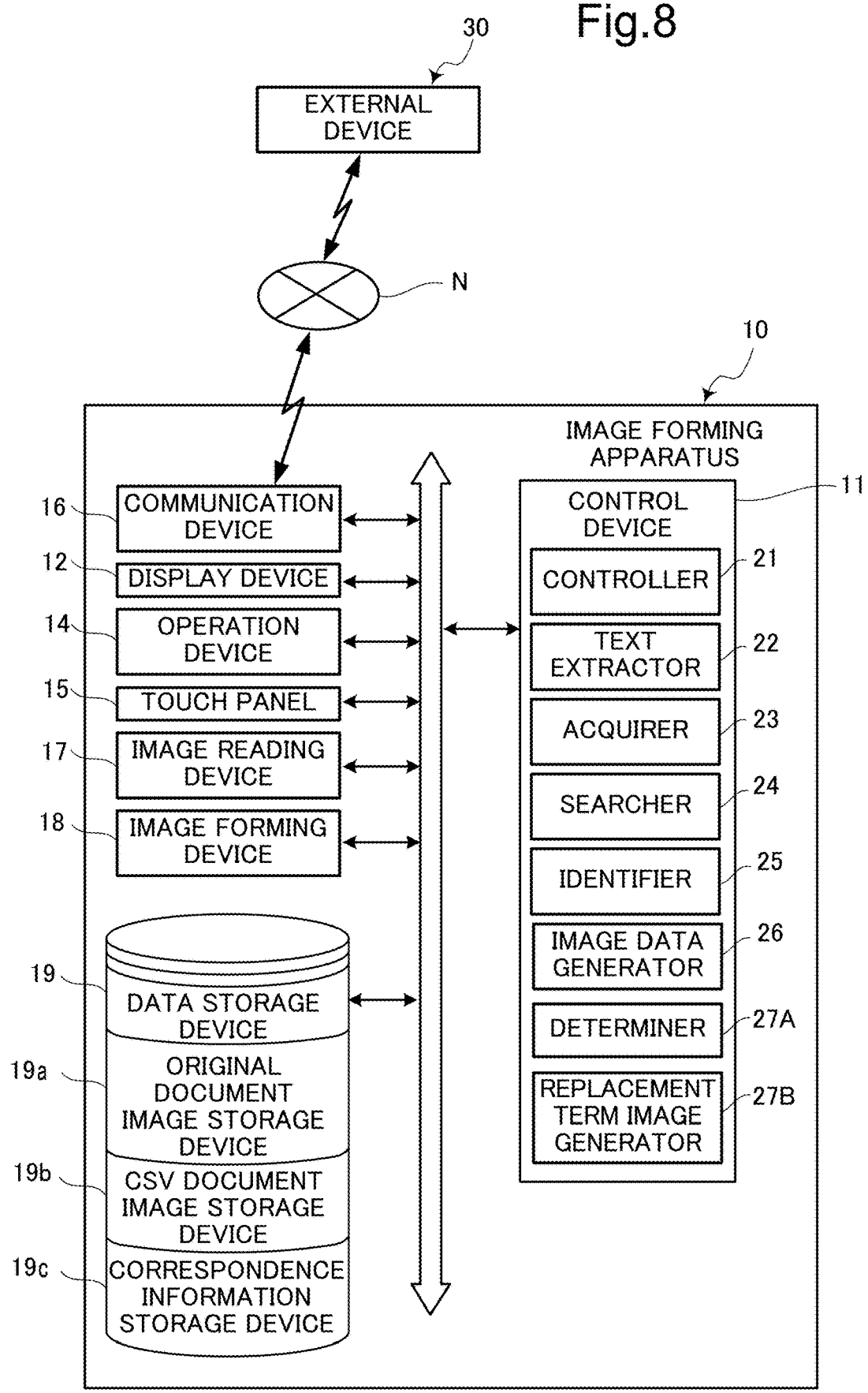
FIG. 8 is a block diagram showing the configuration of an image forming apparatus according to a second embodiment.
Figure 9:
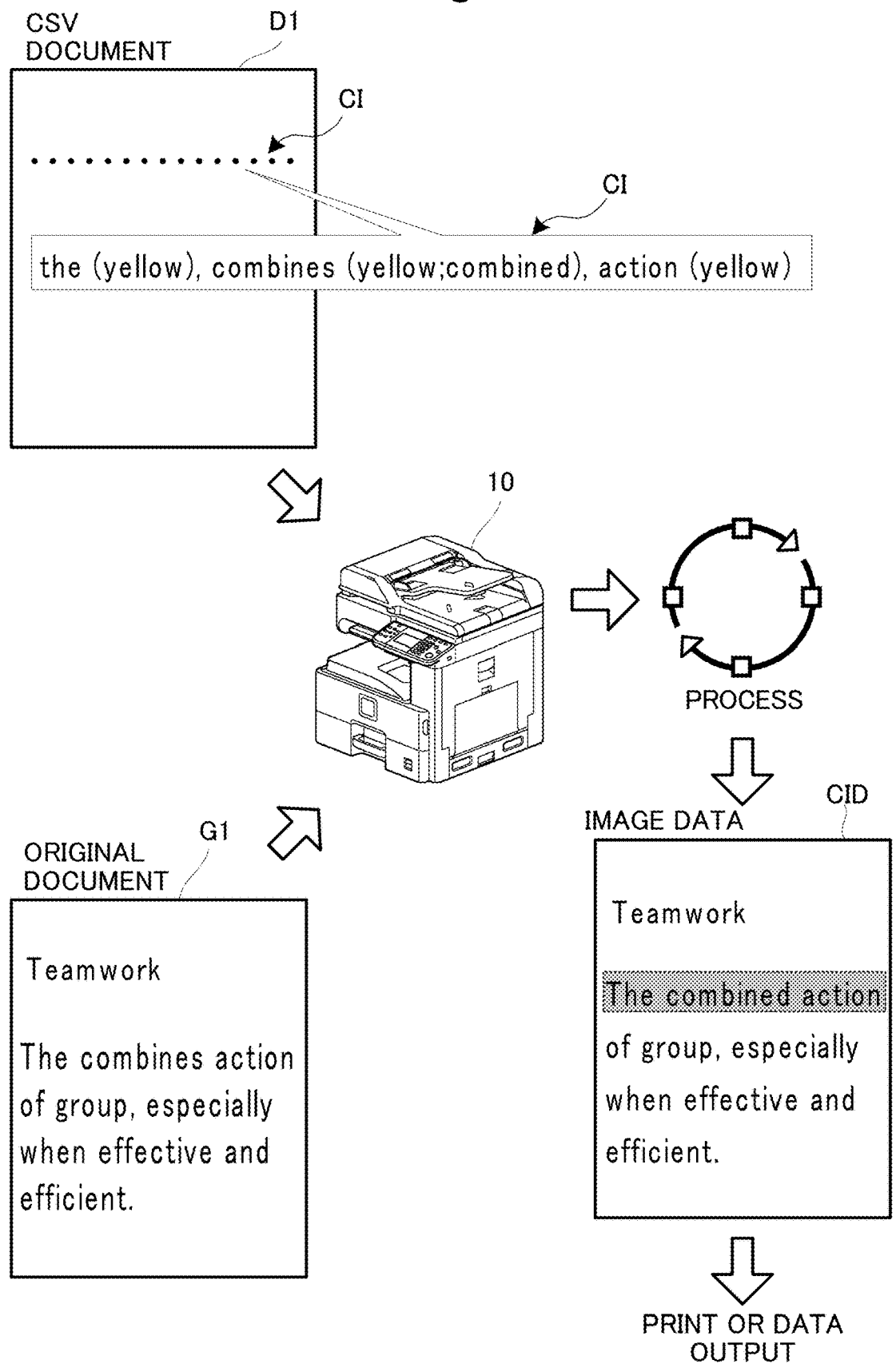
FIG. 9 is a diagram conceptually showing highlighting processing in the second embodiment.
Figure 10:
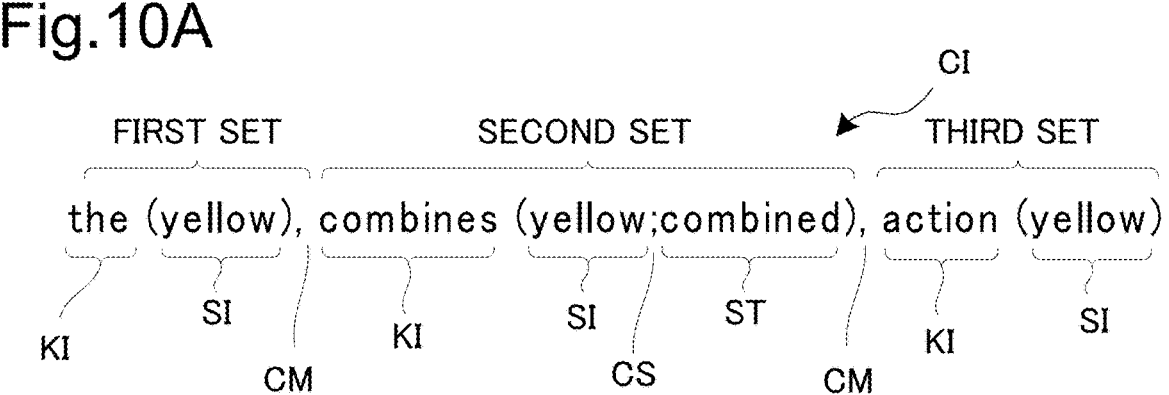
FIG. 10A shows an example of correspondence information printed on a CSV document in the second embodiment.
FIG. 10B shows an example of image data in which an image of a replacement term specified by the CSV document is synthesized on the location of a target term within image data of an original document.
Figure 11:
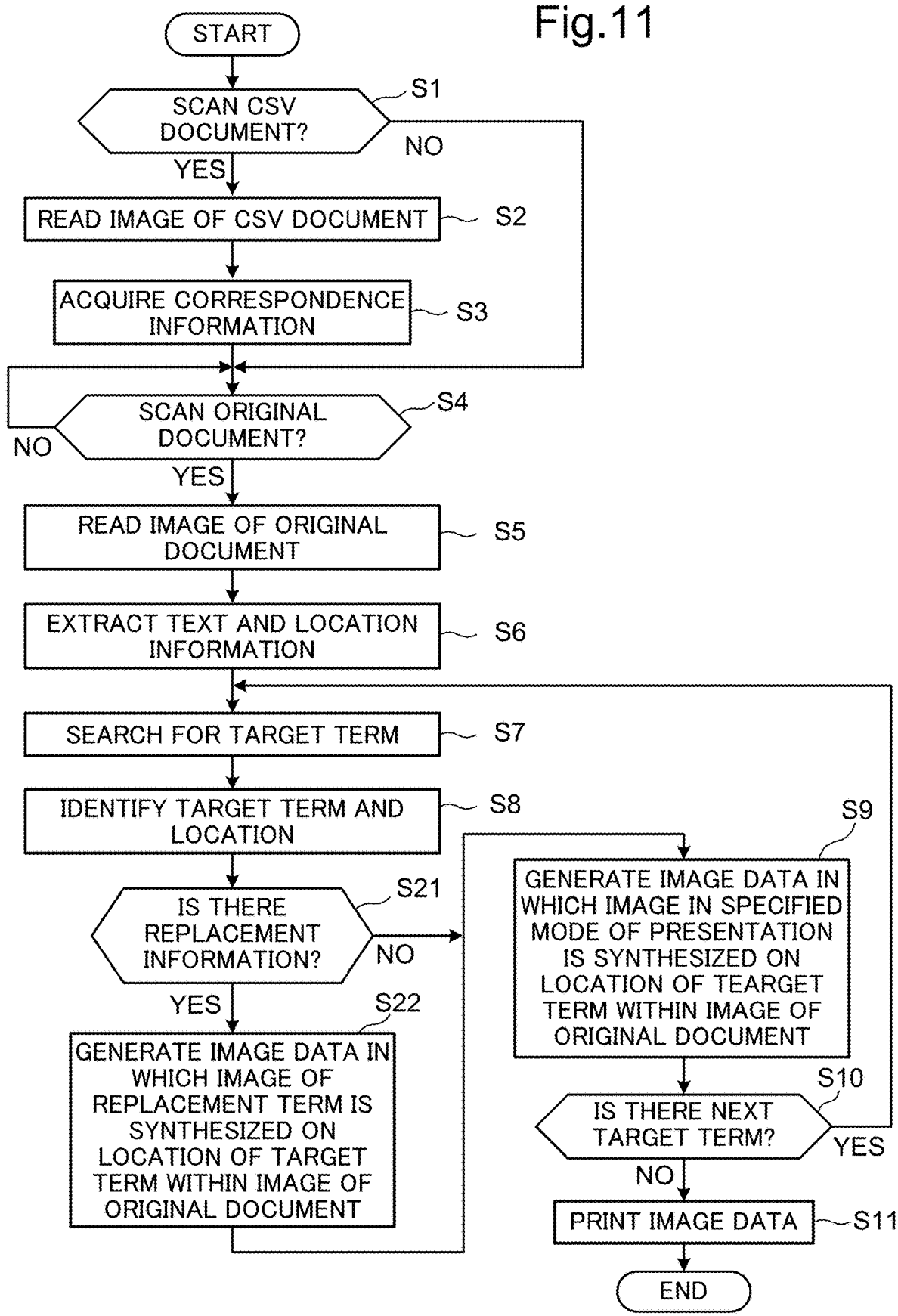
FIG. 11 is a flowchart showing an example of document highlighting processing according to the second embodiment.

Next, a description will be given of an image forming apparatus according to a second embodiment with reference to FIGS. 8 to 11. FIG. 8 is a block diagram showing the configuration of the image forming apparatus according to the second embodiment. FIG. 9 is a diagram conceptually showing highlighting processing in the second embodiment. FIG. 10A shows an example of correspondence information printed on a CSV document in the second embodiment and FIG. 10B shows an example of image data in which an image of a replacement term specified by the CSV document is synthesized on the location of a target term within image data of an original document. FIG. 11 is a flowchart showing an example of the document highlighting processing according to the second embodiment.

The image forming apparatus 10 according to the second embodiment is different from the first embodiment in that it includes a determiner 27A and a replacement term image generator 27B. The same components as those described in the first embodiment are designated by the same reference numerals and further explanation thereof is omitted.

As shown in FIGS. 9 and 10A, correspondence information CI in the second embodiment contains a piece of replacement information placed within a pair of parentheses and just after a predetermined piece of specification information SI. As shown in FIG. 10A, a piece of replacement information is composed of: a replacement mark CS (for example, semicolon) placed just after a predetermined piece of specification information SI; and a replacement term ST placed just after the replacement mark CS and to replace a target term.

The determiner 27A determines whether or not the correspondence information CI acquired by the acquirer 23 contains any piece of replacement information (i.e., a replacement mark CS and a replacement term ST) shown in FIG. 10A.

When the determiner 27A determines that the correspondence information CI contains a piece of replacement information, the replacement term image generator 27B generates an image of a replacement term ST to replace a target term identified by the identifier 25. For example, as shown in FIG. 10B, when the determiner 27A determines that the correspondence information CI contains a piece of replacement information, the replacement term image generator 27B generates an image of "combined" as a replacement term ST to replace, for example, a misspelled word "combines" which is a target term identified by the identifier 25.

Specifically, as shown in FIG. 10B, the replacement term image generator 27B generates an image of "combined" which is a replacement term ST of a size falling within a rectangular region having, as corners, two coordinates P3 and P4 of "combines" which is a target term identified by the identifier 25 (the coordinates of upper left and lower right corners in the location of "combines" within the image of the original document G1).

When the determiner 27A determines that the correspondence information CI contains a piece of replacement information (a replacement mark CS and a replacement term ST), the image data generator 26 generates image data CID in which an image presented in a mode of presentation ("yellow marker" shown in FIG. 4C) specified by the piece of specification information SI ("yellow" shown in FIG. 4B) in the correspondence information CI acquired by the acquirer 23 and the image of the replacement term ST generated by the replacement term image generator 27B are synthesized on the location of the target term "combines" identified by the identifier 25 and being within the image of the original document G1 stored in the original document image storage device 19a.

Specifically, as shown in FIG. 10B, the image data generator 26 sets a rectangular region having as corners two coordinates P3 and P4 (the coordinates of the upper left and lower right corners in the location of "combines" within the image of the original document G1) identified by the identifier 25 and fills the rectangular region with yellow to generate an image of a yellow marker. Then, the image data generator 26 generates image data CID in which: the image of the replacement term ST generated by the replacement term image generator 27B is synthesized on the image of the original document G1 to align the upper left and lower right corners of the image of the replacement term ST with the two coordinates P3 and P4 within the image of the original document G1; and, subsequently, the image of the yellow marker is synthesized on the image of the original document G1 to align the upper left and lower right corners of the image of the yellow marker with the two coordinates P3 and P4 within the image of the original document G1.

In short, the image data generator 26 generates image data CID in which the image of the yellow marker and the image of the replacement term ST (the image of "combined") generated by the replacement term image generator 27B are synthesized on the image of the original document G1 to align them with the two coordinates P3 and P4 within the image of the original document G1.

Note that the image of the replacement term ST generated by the replacement term image generator 27B is formed by superimposing a colored (for example, black) letter image of "combined", which is a replacement term ST, on a background image having opacity (a transparency of 0%). Then, the image of the yellow marker having a transparency is superimposed on the image of the replacement term ST. Thus, the misspelled word "combines" is hidden behind the image of the replacement term ST and is therefore invisible, but the visibility of the replacement term ST and the yellow marker is secured.

Alternatively, the replacement term image generator 27B may detect, from the colors of pixels of the original document image data, the background color of the location of the target term identified by the identifier 25 (preferably, a location to be replaced by the replacement term ST) and select the detected background color as the color of the above-mentioned background image. Thus, an image of the replacement term ST having a background image having the same color as the background color of the original document G1 can be synthesized, which makes the image of the replacement term ST less obtrusive.

A description will be given below of document highlighting processing according to the second embodiment with reference to FIG. 11. The document highlighting processing according to the second embodiment is different from the document highlighting processing according to the first embodiment in that steps S21 and S22 are added. Therefore, the following is a description of S21 and S22.

The determiner 27A determines whether or not the correspondence information CI acquired by the acquirer 23 contains any piece of replacement information (i.e., a replacement mark CS and a replacement term ST) shown in FIG. 10A (S21).

When the determiner 27A determines that the correspondence information CI contains a piece of replacement information (YES in S21), the replacement term image generator 27B generates an image of a replacement term ST to replace a target term identified by the identifier 25 (S22). When the determiner 27A determines that the correspondence information CI contains no piece of replacement information (NO in S21), the controller 21 allows the processing to proceed to S9.

In the second embodiment, the determiner 27A determines whether or not the correspondence information CI acquired by the acquirer 23 contains any piece of replacement information. When the determiner 27A determines that the correspondence information CI contains a piece of replacement information, the replacement term image generator 27B generates an image of a replacement term ST to replace a target term identified by the identifier 25. When the determiner 27A determines that the correspondence information CI contains a piece of replacement information, the image data generator 26 generates image data in which an image presented in a mode of presentation specified by the piece of specification information SI in the correspondence information CI acquired by the acquirer 23 and the image of the replacement term generated by the replacement term image generator 27B are synthesized on the location of the target term identified by the identifier 25 and being within the image of the original document G1 stored in the original document image storage device 19a. Thus, image data can be generated in which the mode of presentation in the location of the target term within the image of the original document G1 has been changed and the target term has been replaced by the replacement term. For example, when the target term is a misdescription, it can be modified to a correct replacement term. In other words, the misspelling can be corrected.

Although in the second embodiment a piece of replacement information is placed within a pair of parentheses and just after a predetermined piece of specification information SI, it may be placed singly within a pair of parentheses.

Figure 12:
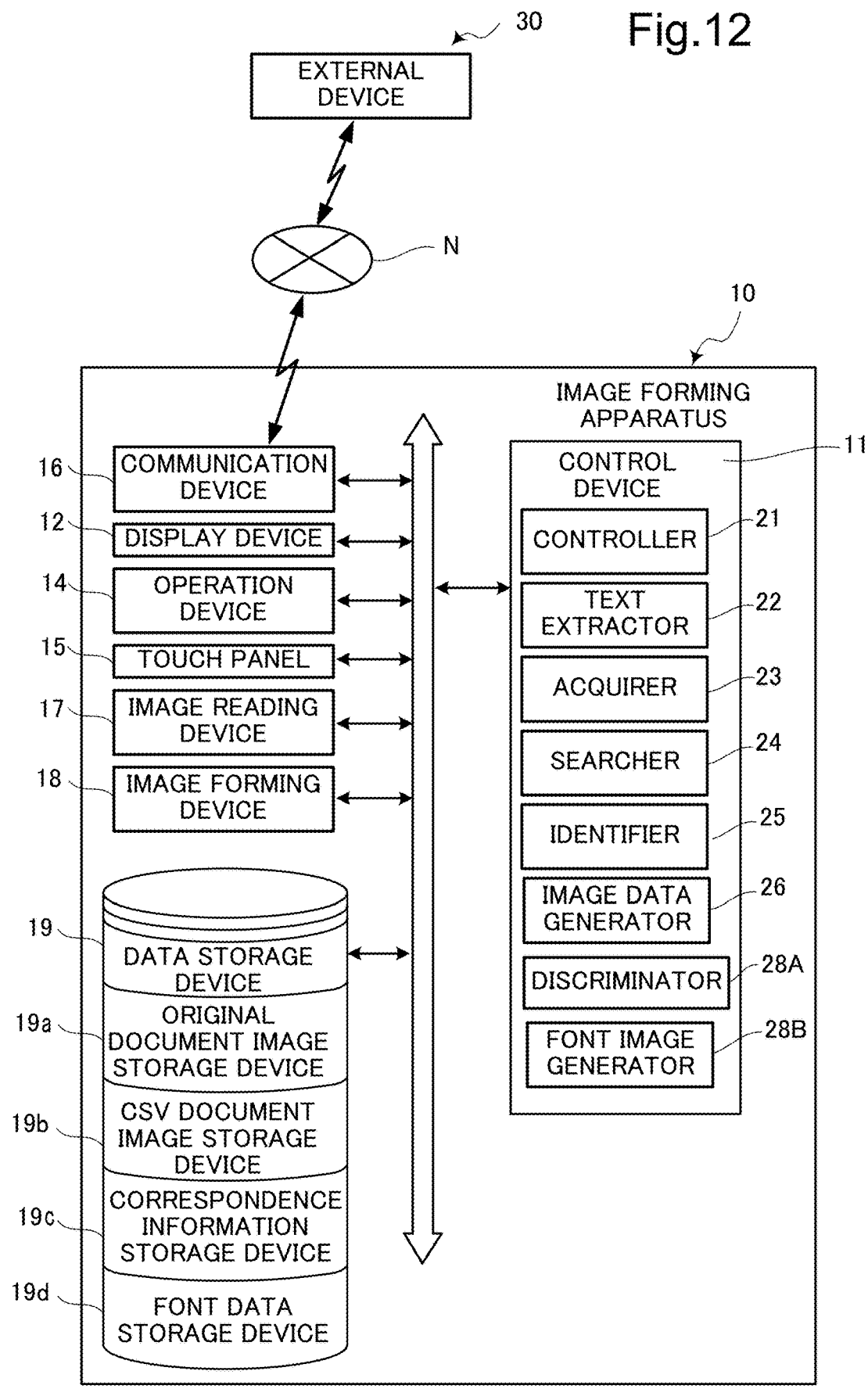
FIG. 12 is a block diagram showing the configuration of an image forming apparatus according to a third embodiment.
Figure 13:
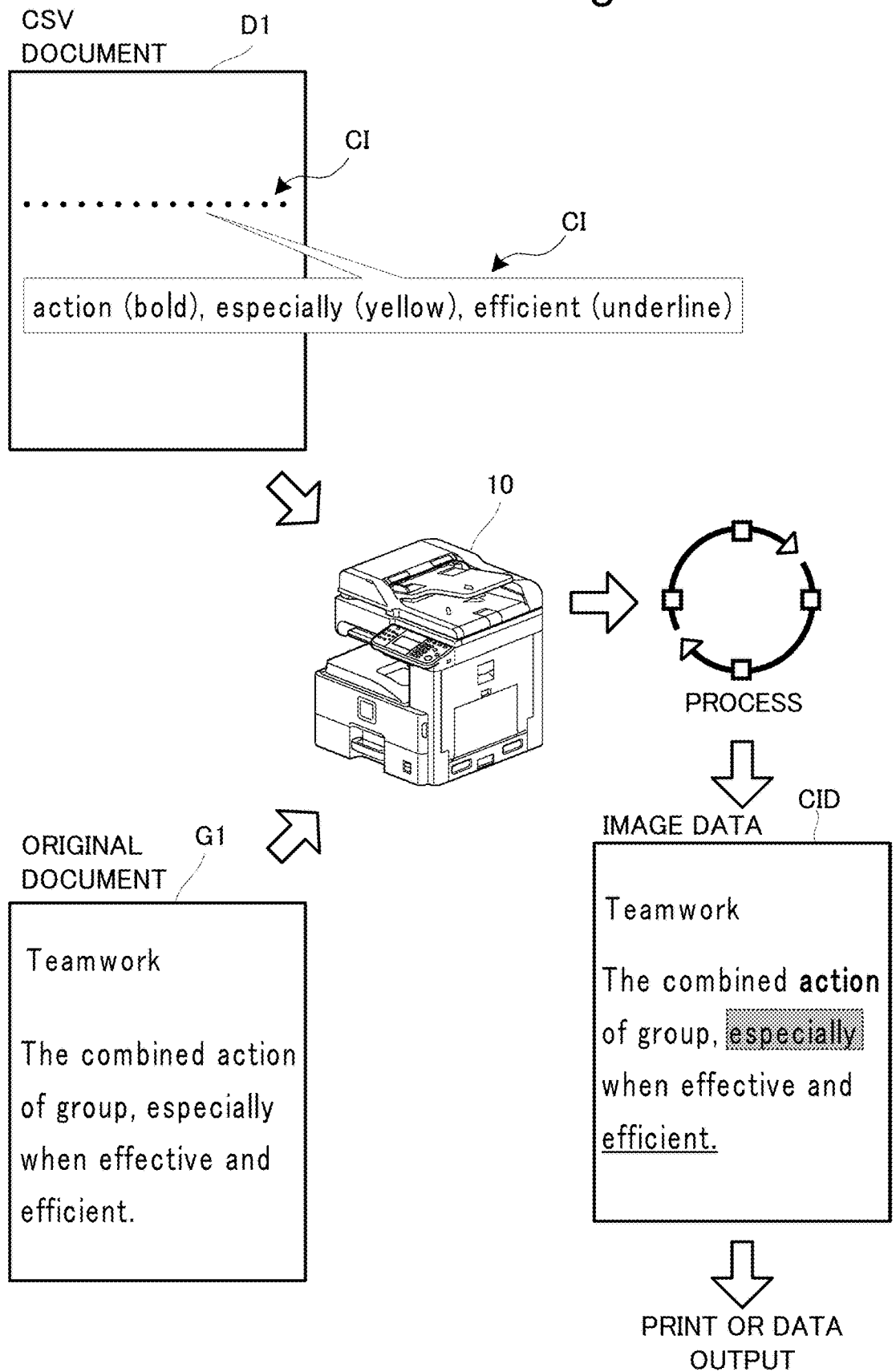
FIG. 13 is a diagram conceptually showing highlighting processing in the third embodiment.
Figures 14A, 14B:
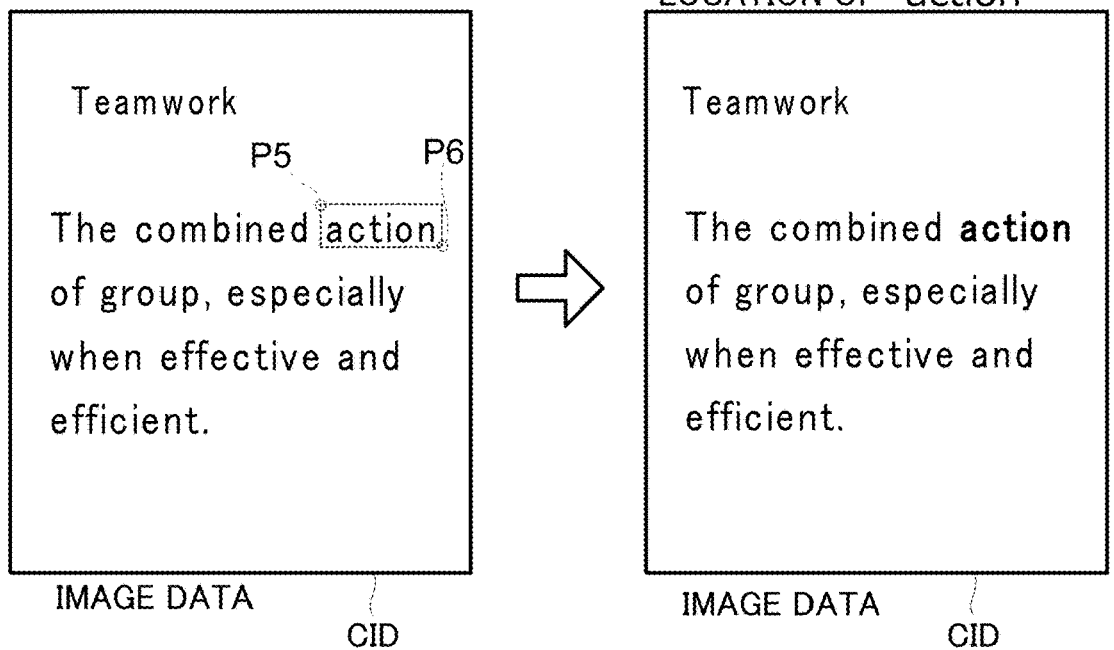
FIG. 14A shows an example of a correspondence information storage table in the third embodiment.
FIG. 14B shows an example of image data in which an image of a term in a font specified by the CSV document is synthesized on the location of a target term within image data of an original document.
Figure 15:
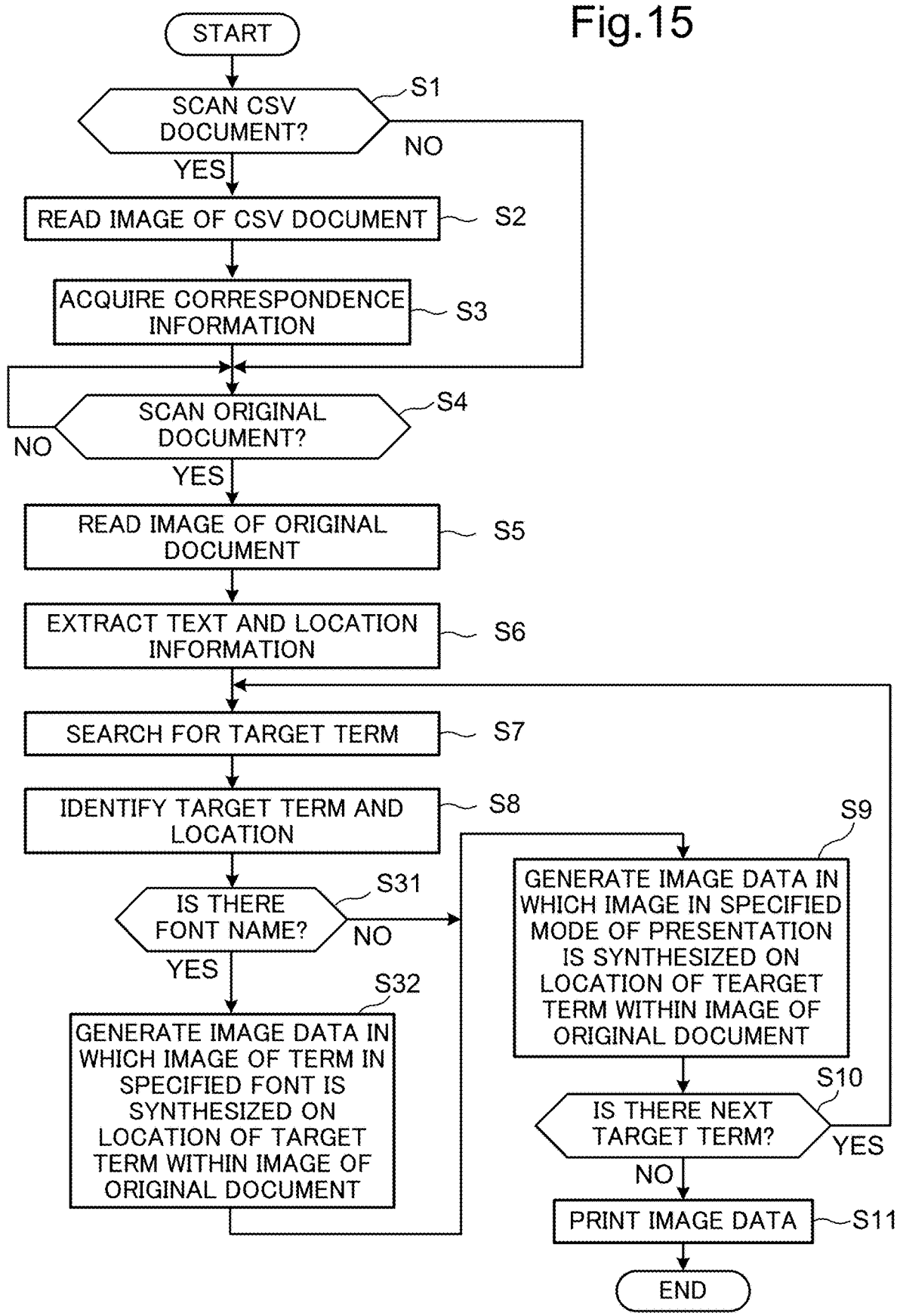
FIG. 15 is a flowchart showing an example of document highlighting processing according to the third embodiment.

Next, a description will be given of an image forming apparatus according to a third embodiment with reference to FIGS. 12 to 15. FIG. 12 is a block diagram showing the configuration of the image forming apparatus according to the third embodiment. FIG. 13 is a diagram conceptually showing highlighting processing in the third embodiment. FIG. 14A shows an example of a correspondence information storage table in the third embodiment and FIG. 14B shows an example of image data in which an image of a term in a font specified by a CSV document is synthesized on the location of a target term within image data of an original document. FIG. 15 is a flowchart showing an example of the document highlighting processing according to the third embodiment.

The image forming apparatus 10 according to the third embodiment is different from the first embodiment in that it includes a font data storage device 19d, a discriminator 28A, and a font image generator 28B. The same components as those described in the first embodiment are designated by the same reference numerals and further explanation thereof is omitted.

As shown in FIG. 12, the font data storage device 19d stores a predetermined font name and font data corresponding to the font name in association with each other. The font data storage device 19d contains a storage table (correspondence information storage table) TB2 shown in FIG. 14A. In the storage table TB2 shown in FIG. 14A, data containing font names and respective pieces of font data associated with the font names is added to the storage table TB1 shown in FIG. 4C. Specifically, in the storage table TB2, if a piece of specification information SI is a piece of font name information indicating a font name, for example, "bold", this shows that the associated mode of presentation is "bold font". For another example, if a piece of specification information SI is "italic", this shows that the associated mode of presentation is "italic font".

The discriminator 28A discriminates whether or not a piece of specification information SI (see FIG. 13) in correspondence information CI acquired by the acquirer 23 is a font name ("bold" or "italic" shown in FIG. 14A). In the third embodiment, as shown in FIG. 13, the discriminator 28A determines that "bold" which is a piece of specification information SI in correspondence information CI acquired by the acquirer 23 is a font name.

As shown in FIG. 13, when the discriminator 28A determines that "bold" which is a piece of specification information SI in correspondence information CI is a font name, the font image generator 28B generates, for a target term "action" identified by the identifier 25, an image of a term in a specified font (an image of "action" in bold font shown in FIG. 13) represented using font data ("bold font" shown in FIG. 14A) corresponding to the font name stored in the font data storage device 19d.

Specifically, as shown in FIG. 14B, the font image generator 28B generates an image of a bold-font term "action" of a size falling within a rectangular region having, as corners, two coordinates P5 and P6 of a target term "action" identified by the identifier 25 (the coordinates of upper left and lower right corners in the location of "action" within the image of the original document G1).

When the discriminator 28A determines that a piece of specification information SI in correspondence information CI is a font name ("bold" or "italic" shown in FIG. 14A), the image data generator 26 generates image data CID in which the image of the bold-font term generated by the font image generator 28B is synthesized on the location of the target term "action" identified by the identifier 25 and being within the image of the original document G1 stored in the original document image storage device 19a.

Note that the image of the term in a specified font generated by the font image generator 28B is formed by superimposing a background image having opacity (a transparency of 0%) and a bold colored (for example, black) letter image of "action". Then, the image of the term in a specified font is synthesized on the location of the target term "action" identified by the identifier 25. Thus, the target term "action" identified by the identifier 25 is hidden behind the background image having opacity (a transparency of 0%) and is therefore invisible, but the visibility of the term in a specified font is secured.

A description will be given below of document highlighting processing according to the third embodiment with reference to FIG. 15. The document highlighting processing according to the third embodiment is different from the document highlighting processing according to the first embodiment in that steps S31 and S32 are added. Therefore, the following is a description of S31 and S32.

The discriminator 28A discriminates whether or not a piece of specification information SI (see FIG. 13) in correspondence information CI acquired by the acquirer 23 is a font name ("bold" or "italic" shown in FIG. 14A) (S31).

As shown in FIG. 13, when the discriminator 28A determines that "bold" which is a piece of specification information SI in correspondence information CI is a font name (YES in S31), the font image generator 28B generates, for a target term "action" identified by the identifier 25, an image of a term in a specified font (an image of "action" in bold font shown in FIG. 13) represented using font data ("bold font" shown in FIG. 14A) corresponding to the font name stored in the font data storage device 19d (S32). When the discriminator 28A determines that a piece of specification information SI (see FIG. 13) in correspondence information CI is not a font name ("bold" or "italic" shown in FIG. 14A) (NO in S31), the controller 21 allows the processing to proceed to S9.

In the third embodiment, when the discriminator 28A determines that a piece of specification information SI in correspondence information CI is a font name, the image data generator 26 generates image data CID in which an image of a term in a specified font generated by the font image generator 28B is synthesized on the location of a target term identified by the identifier 25 and being within an image of an original document G1 stored in the original document image storage device 19a. Thus, image data can be generated in which the target term in the image of the original document G1 has been changed to the term in a specified font.

The present disclosure is not limited to the structures and configurations of the above embodiments and can be modified in various ways. For example, the CSV document image storage device 19b stores CSV document image data representing an image of a CSV document D1 acquired by reading of the CSV document D1 shown in FIG. 3 by the image reading device 17. The present disclosure is not limited to this configuration. The image forming apparatus 10 may read CSV document image data received by the communication device 16 or CSV document image data stored in a portable recording medium (for example, a USB memory) and allow the CSV document image storage device 19b to store the read CSV document image data. In this case, the acquirer 23 needs to do OCR processing on the image of the CSV document D1 stored in the CSV document image storage device 19b to extract correspondence information CI in the CSV document D1. Alternatively, in the case of storage in the form of CSV document data (text data indicating correspondence information CI) in the data storage device 19, the acquirer 23 can directly use the correspondence information CI without the need to do OCR processing.

Although in the above embodiments each keyword KI of the correspondence information CI is a single word as shown in FIG. 4B, the keyword KI may be a phrase or a sentence. When a keyword KI in correspondence information CI is composed of three words, for example, "the combined action (yellow)", a marker image is synthesized on the location of "the combined action".

The structures, configurations, and processing described in the above embodiments with reference to FIGS. 1 to 15 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a scanner that reads an image of an original document;
a storage device that stores the image of the original document read by the scanner; and
a control device that includes a processor and functions, through the processor executing a control program, as:
a text extractor that analyses the image of the original document stored in the storage device and extracts a text in the original document and location information on the text in association with each other;
an acquirer that acquires correspondence information in which a predetermined keyword and a predetermined piece of specification information specifying a mode of presentation in a location of the predetermined keyword are associated with each other;
a searcher that searches the text in the original document extracted by the text extractor for a target term matching the predetermined keyword of the correspondence information acquired by the acquirer;
an identifier that identifies the target term for which the searcher has searched, and also identifies a location of the target term within the image of the original document from the location information on the text extracted by the text extractor, and
an image data generator that generates image data in which an image presented in the mode of presentation specified by the predetermined piece of specification information in the correspondence information acquired by the acquirer is synthesized on the location of the target term identified by the identifier and being within the image of the original document stored in the storage device, wherein
the correspondence information is data in a CSV (comma separated value) format which includes at least one unit of information consisting of a set containing the predetermined keyword, a pair of parentheses placed just after the predetermined keyword, and the predetermined piece of specification information placed in the pair of parentheses and in which when including a plurality of units of information, a comma is placed between each adjacent pair of the plurality of units of information to separate each unit of information with the comma, the acquirer acquires the one unit or plurality of units of information constituting the correspondence information, when the correspondence information is composed of the one unit of information, the searcher searches the text in the original document extracted by the text extractor for a target term matching the predetermined keyword of the one unit of information acquired by the acquirer, when the correspondence information is composed of the plurality of units of information, the searcher searches the text for a plurality of target terms matching the respective predetermined keywords of the plurality of units of information acquired by the acquirer, the identifier identifies the one or plurality of target terms for which the searcher has searched, and identifies a location or locations of the one or plurality of target terms within the image of the original document from the location information on the text extracted by the text extractor, when the correspondence information is composed of the one unit of information, the image data generator generates image data in which an image presented in the mode of presentation specified by the predetermined piece of specification information in the one unit of information acquired by the acquirer is synthesized on the location of the one target term identified by the identifier and being within the image of the original document stored in the storage device, and when the correspondence information is composed of the plurality of units of information, the image data generator generates image data in which respective images in the modes of presentation specified by the predetermined pieces of specification information in the plurality of units of in-formation acquired by the acquirer are associated and synthesized with the respective locations of the plurality of target terms identified by the identifier and being within the image of the original document stored in the storage device, wherein the correspondence information further contains a piece of replacement information placed within the pair of parentheses and just after the predetermined piece of specification in-formation, the piece of replacement information is composed of: a replacement mark placed just after the predetermined piece of specification information; and a replacement term placed just after the replacement mark and to replace the target term, the control device further functions, through the processor executing the control program, as:

a determiner that determines whether or not the correspondence information acquired by the acquirer contains the piece of replacement information; and a replacement term image generator that generates, when the determiner determines that the correspondence information contains the piece of replacement information, an image of the replacement term to replace the target term identified by the identifier, and when the determiner determines that the correspondence information contains the piece of replacement information, the image data generator generates image data in which an image presented in the mode of presentation specified by the piece of specification information in the correspondence information acquired by the acquirer and the image of the replacement term generated by the replacement term image generator are synthesized on the location of the target term identified by the identifier and being within the image of the original document stored in the storage device.

2. The image forming apparatus according to claim 1, wherein the acquirer acquires, as the predetermined piece of specification information, a piece of information specifying a color, shading, underlining or addition of a strike-through line in the location of the predetermined keyword.

3. The image forming apparatus according to claim 1, wherein the replacement term image generator generates the image of the replacement term formed by superimposing a colored letter image of the replacement term on a background image having opacity, and when the determiner determines that the correspondence information contains the piece of replacement information, the image data generator generates image data in which the image of the replacement term generated by the replacement term image generator is superimposed on the location of the target term identified by the identifier and being within the image of the original document stored in the storage device and an image presented in a mode of presentation having a transparency and specified by the predetermined piece of specification information in the correspondence information acquired by the acquirer is further superimposed on the image of the replacement term.

4. The image forming apparatus according to claim 1, wherein the storage device further stores a predetermined font name and font data corresponding to the font name in association with each other, wherein the control device further functions, through the processor executing the control program, as:

a discriminator that discriminates whether or not the predetermined piece of specification information in the correspondence information acquired by the acquirer is the predetermined font name; and a font image generator that generates, when the discriminator determines that the predetermined piece of specification information in the correspondence information is the predetermined font name, an image of a term in a specified font for the target term identified by the identifier, the specified font being represented using the font data corresponding to the predetermined font name stored in the storage device, and when the discriminator determines that the predetermined piece of specification information in the correspondence information is the predetermined font name, the image data generator generates image data in which the image of the term in the specified font generated by the font image generator is synthesized on the location of the target term identified by the identifier and being within the image of the original document stored in the storage device.

5. An image forming apparatus comprising:

a scanner that reads an image of an original document;

a storage device that stores the image of the original document read by the scanner; and a control device that includes a processor and functions, through the processor executing a control program, as:

a text extractor that analyses the image of the original document stored in the storage device and extracts a text in the original document and location information on the text in association with each other;

an acquirer that acquires correspondence information in which a predetermined keyword and a predetermined piece of specification information specifying a mode of presentation in a location of the predetermined keyword are associated with each other;

a searcher that searches the text in the original document extracted by the text extractor for a target term matching the predetermined keyword of the correspondence information acquired by the acquirer;

an identifier that identifies the target term for which the searcher has searched, and also identifies a location of the target term within the image of the original document from the location information on the text extracted by the text extractor; and an image data generator that generates image data in which an image presented in the mode of presentation specified by the predetermined piece of specification information in the correspondence information acquired by the acquirer is synthesized on the location of the target term identified by the identifier and being within the image of the original document stored in the storage device, wherein the scanner reads an image of a print on which the correspondence information is printed, the storage device further stores the image of the print read by the scanner, and the acquirer analyses the image of the print stored in the storage device and extracts the correspondence information in the print to acquire the correspondence information.

* * * * *